(12) United States Patent
Hook et al.

(10) Patent No.: US 10,680,878 B2
(45) Date of Patent: *Jun. 9, 2020

(54) NETWORK-ENABLED DEVICES

(71) Applicant: INTERNATIONAL BUSINESS MACHINES CORPORATION, Armonk, NY (US)

(72) Inventors: James K. Hook, Eastleigh (GB); Hamish C. Hunt, Ashford (GB); Nicholas K. Lincoln, Hampshire (GB); Simon D. Stone, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,288

(22) Filed: Oct. 27, 2017

(65) Prior Publication Data

US 2018/0091362 A1    Mar. 29, 2018

Related U.S. Application Data

(63) Continuation of application No. 15/248,324, filed on Aug. 26, 2016, now Pat. No. 10,277,456.

(51) Int. Cl.
*H04L 12/24* (2006.01)
*H04L 12/26* (2006.01)

(52) U.S. Cl.
CPC ...... *H04L 41/0668* (2013.01); *H04L 41/0816* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 7,529,972 B2 | 5/2009 | Zelikov et al. | |
| 9,276,807 B2 | 3/2016 | Nasir et al. | |
| 9,684,478 B2 | 6/2017 | Ramchandran | |
| 2005/0144268 A1 | 6/2005 | El-Batal et al. | |
| 2007/0055472 A1* | 3/2007 | O'Toole | H04W 40/10 702/127 |
| 2008/0189260 A1* | 8/2008 | Arnold | G06F 16/58 |

(Continued)

OTHER PUBLICATIONS

Hook, et al., "Network-Enabled Devices" U.S. Appl. No. 15/248,324, filed Aug. 26, 2016.

(Continued)

*Primary Examiner* — Yaotang Wang
(74) *Attorney, Agent, or Firm* — Cantor Colburn LLP; Reza Sarbakhsh

(57) ABSTRACT

Disclosed are methods, systems and computer program products for operating and controlling network-enabled devices. A network-enabled device communicates capability information representative of its set of capabilities. The network-enabled device also communicates a status signal indicative of the status of the device. It may be determined that the first network-enabled device is unable or unavailable to perform a function based on a status signal communicated by the first network-enabled device. A second network-enabled device may be identified to assign a failover function to based on the respective capabilities of the second network-enabled devices.

5 Claims, 8 Drawing Sheets

(56) References Cited

U.S. PATENT DOCUMENTS

| | | |
|---|---|---|
| 2009/0022068 A1 | 1/2009 | Iyer et al. |
| 2010/0125682 A1 | 5/2010 | Andres et al. |
| 2010/0162036 A1* | 6/2010 | Linden .................. G06F 11/181 714/4.11 |
| 2011/0173285 A1 | 7/2011 | Cripe et al. |
| 2012/0304191 A1* | 11/2012 | Morgan ................ G06F 9/5088 718/105 |
| 2013/0326261 A1 | 12/2013 | Paulson |
| 2014/0003254 A1 | 1/2014 | Andreoli-Fang et al. |
| 2014/0129873 A1 | 5/2014 | McGill et al. |
| 2014/0359613 A1 | 12/2014 | Tsirkin |
| 2015/0121134 A1 | 4/2015 | Wipfel et al. |
| 2015/0149626 A1 | 5/2015 | Luna et al. |
| 2016/0165663 A1 | 6/2016 | Shanmugam et al. |

OTHER PUBLICATIONS

List of IBM Patents or Patent Applications Treated as Related; (Appendix P), Date Filed Oct. 27, 2017; 2 pages.

Ask F5 "Manual Chapter: Configuring a Sync-Failover Device Group", retrieved from Internet: Aug. 2, 2016; http://support.f5.com/kb/en-us/products/big-ip_ltm/manuals/product/tmos-implementations-11-2-0/5.html; 9 pgs.

Author Unknown "Device Failover", retrieved from Internet Aug. 2, 2016; URL: http://docs-legal.fortinet.com/fos50hlp/50/index.html#page/FortiOSY%205.0%20Help/HA_failover.086.008.html; 2 pgs.

Cisco Systems, Inc., "Cisco ASDM User Guide", Version 5.2; copyright 2008 Disco Systems, Inc.; 884 pgs.

Mel et al., "The NIST Definition of Cloud Computing", NIST National Institute of Standards and Technology, U.S. Department of Commerce, Special Publication 800-145; Sep. 2011; 7 pgs.

\* cited by examiner

NETWORK-ENABLED DEVICES

DOMESTIC PRIORITY

This application is a continuation of the legally related U.S. application Ser. No. 15/248,324 filed Aug. 26, 2016, which is fully incorporated herein by reference.

BACKGROUND

The present invention relates to network-enabled devices and systems comprising network-enabled devices.

The present invention further relates to a computer program product comprising computer-readable program code that enables a processor of a processing system to implement a method for operating a network-enabled device.

Network-enabled devices are widely known and typically provisioned for integration (e.g. connection) with a networked system. When integrated with a networked system, such network-enabled devices may send and receive information which may facilitate or assist operation of such devices.

SUMMARY

According to an embodiment of the present invention there is provided a network-enabled device having a set of capabilities for performing one or more functions, the device comprising: a communication interface adapted to communicate, to at least one network node: capability information representative of the set of capabilities of the device; and a status signal indicative of the status of the device, and to receive a function assignment signal indicative of an assigned function from an application of a network node, wherein the device is adapted to identify the assigned function from the received function assignment signal and to perform the assigned function.

According to another aspect, there is provided a system comprising: a first network-enabled device according to an embodiment and having a first set of capabilities; a plurality of second network-enabled devices according to an embodiment and each having a respective set of different capabilities, wherein the system is adapted to determine the first network-enabled device is unable or unavailable to perform a function based on a status signal communicated by the first network-enabled device, to identify a second network-enabled device to assign a failover function to based on the respective capabilities of the second network-enabled devices, and to communicate, to the identified second network-enabled device, an assignment signal identifying the failover function as the assigned function.

According to another embodiment of the present invention, there is provided a computer-implemented method of operating a network-enabled device having a set of capabilities for performing one or more functions, the method comprising: communicating, from the network-enabled device to at least one network node: capability information representative of the set of capabilities of the device; and a status signal indicative of the status of the device; receiving, at the network-enabled device, a function assignment signal indicative of an assigned function from an application of a network node; identifying, at the network-enabled device, the assigned function from the received function assignment signal; and controlling the network-enabled device to perform the assigned function.

BRIEF DESCRIPTION OF THE DRAWINGS

Embodiments of the present invention will now be described, by way of example only, with reference to the following drawings, in which.

DETAILED DESCRIPTION

Figure 1:
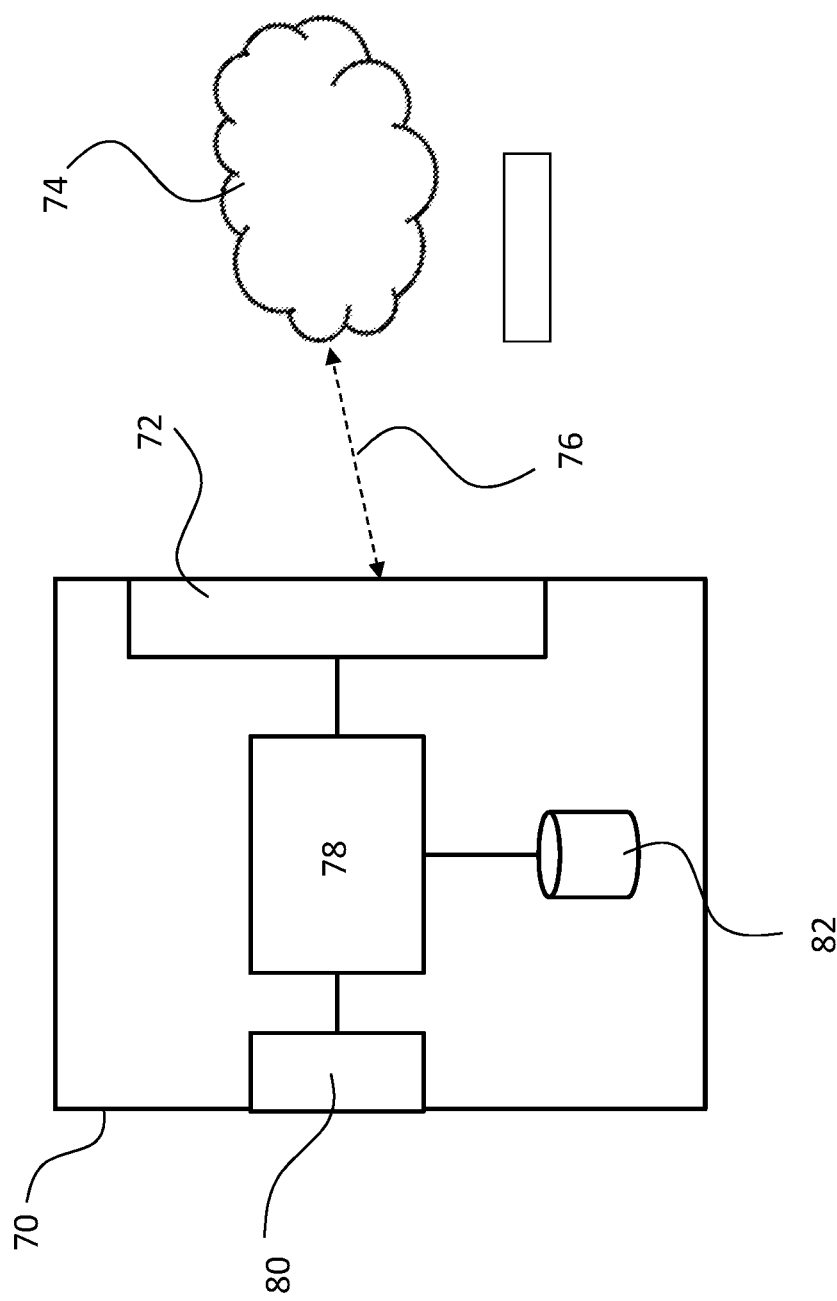
FIG. 1 is a simplified block diagram of an exemplary implementation of a network-enabled device according to an embodiment.

The present invention seeks to provide a concept for network-enabled (or 'connected') device functionality re-assignment upon device failure (e.g. inability, unavailability, or lack of power or signal).

The present invention further seeks to provide a computer program product including computer program code for implementing the proposed device operation and system control concepts when executed on a processor.

The present invention yet further seeks to provide one or more network-enabled device component adapted to execute such computer program code.

Proposed is a concept of re-assigning functionality of a failing or failed network-enabled (e.g. "connected" or "internet-enabled") device to another device of the same system. Such re-assignment may be implemented based on capability information representative of the capabilities of the devices of the system. By identifying one or more devices with capabilities that are common with (e.g. similar to or the same as) those of the failing/failed device, functionality of the failing/failed device may be reassigned to those one or more devices so that the same or similar functionality is provided. This may avoid the need for spare, backup, or identical network-device. It may also avoid the need for there to be a one-to-one ("1:1") mapping of devices in a system of connected devices (e.g. where if one device fails, the process/function moves to another device, which may be pre-configured/predetemined). Proposed concepts account for non-structured real-world connected systems/networks where there may be no true one-to-one device mappings, but there are instead systems/networks comprising differing devices without identical backups.

Thus, there is described a device failover concept wherein, when a device fails, a replacement configuration takes the place of the failed device and provides a similar service/function to that of the failed device. For example, within a system of network-connected devices, a set of one or more devices which share common capabilities or functionality with that of the failed device may be identified. From that set of devices, one or devices then take responsibility of (e.g. be assigned) the function(s) of the failed device. In this way, part of a function of the failed device may be assigned to a first inheriting device that differs from the failed device, and another part of the function may be assigned to a second inheriting device that differs from the failed device (and also differs from the first inheriting device).

A network-enabled device may communicate capability information representative of the capabilities of a device to devices or nodes of a network it connects to. Such capability information may, for example, comprise a fuzzy representation of the set of capabilities of the device. It may also communicate a status signal indicative of the status of the device. The status signal may, for example, be a heartbeat signal or power-status signal that may be used (e.g. monitored) to determine whether or not the device is still operating.

In the event of detecting failure (or expected failure) of the network-enabled device (by detecting a loss of the status signal for example), the fuzzy representations of capabilities submitted by each device of the network may be analyzed in order to identify which of the networked devices may perform part or all of a function (or similar function) of that of the failing/failed network-enabled device. Identified devices may then be assigned failover functions based on their identified capabilities so that the same or similar function(s) of the failing/failed network-enabled device are undertaken by the identified devices.

A network management component, such as a management server, may thus be proposed which may receive capability information from network-enabled devices and monitor one or more status signals to determine when a network-enabled device may be unable or unavailable to perform a function. The network management component may then analyze the received capability information to identify one or more network-enabled devices to assign one or more failover functions to. An assignment signal identifying the failover function(s) may be communicated by the network management component to one or more network-enabled devices so as to assign the failover function(s).

Proposed concepts for assigning failover functions to one or more devices of the network may be implemented in a distributed fashion (e.g. via an 'auction' which enables devices in the system to 'bid' for components of (or the complete) failover functions). In this way, a centralized processing resource may be avoided and, instead, processing requirements may be shared throughout the network according to available resources. This may provide the performance benefit of reducing an amount of network traffic to a single network node.

Illustrative embodiments may, therefore, provide concepts for reassigning functionality between disparate systems upon device failure. Dynamic distributed device failover concepts may, therefore, be provided by proposed embodiments.

Modifications and additional steps to traditional network-enabled devices or networked devices may also be proposed which may enhance the value and utility of the proposed concepts.

Embodiments may be employed in an internet-enabled electronic device or an internet-enabled electrical appliance. For example, there may be provided an internet-enabled alarm clock according to a proposed embodiment. Also, embodiments may be implemented in a server device. Such a server device may be a cloud-based server resource accessible via the Internet.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. It should also be understood that the Figures are merely schematic, are not drawn to scale, and the same reference numerals are used throughout the Figures to indicate the same or similar parts. Many modifications to the depicted environments may be made without departing from the spirit and scope of the present invention.

Also, those of ordinary skill in the art will appreciate that the hardware and/or architectures in the Figures may vary depending on the implementation.

Where embodiments of the present invention constitute a method, it should be understood that such a method is a process for execution by a computer, i.e. is a computer-implementable method. The various steps of the method, therefore, reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), an internet-enabled electronic device, an internet-enabled electrical appliance, a server or a collection of PCs and/or servers connected via a network such as a local area network, the Internet and so on to cooperatively execute at least one embodiment of the methods of the present invention.

Further, the processes of the illustrative embodiments may be applied to multiprocessor/server systems, other than those illustrated, without departing from the scope of the proposed concepts.

Moreover, the system may take the form of any of a number of different processing devices including client computing devices, server computing devices, a tablet computer, laptop computer, smartphone, smartwatch telephone or other communication-enabled devices, network-enabled device, personal digital assistants (PDAs), or the like. In some illustrative examples, a network node/device and a network management device may comprise a portable computing device that is configured with flash memory to provide non-volatile memory for storing operating system files and/or user-generated data, for example. Thus, the system may essentially be any known or later-developed processing system without architectural limitation.

A proposed concept may enhance a cloud-based service provisioning system by making operations more efficient or more robust to component/device failure. Embodiments may enable functionality to be analyzed and re-assigned to appropriate device so as to maintain the same or similar services/function of a failing or failed device. Such proposals can extend or improve the processing capabilities or efficiency of a cloud-based service delivery system.

Turning now to FIG. 1, an exemplary implementation of a network-enabled device 70 according to an embodiment will now be described.

The network-enabled device 70 has a set of capabilities for performing a function. Here, the network-enabled device may comprise a communication interface 72 adapted to communicate with a remotely located network node (not shown) via the internet 74, for example using a wireless communication link 76. Any suitable short-range or long-range communication links and/or protocols may be employed.

The communication interface 72 may communicate capability information with representative of the set of capabilities of the device. By way of example, the capability information may comprise a fuzzy representation of the set of capabilities of the device 70.

For instance, an exemplary fuzzy representation may largely follow a conventional fuzzy classification (which is the process grouping elements into a fuzzy set whose membership function is defined by the truth value of a fuzzy propositional function). A fuzzy propositional function is, analogous to, an expression containing one or more variables, such that, when values are assigned to these variables, the expression becomes a fuzzy proposition in the sense of. Accordingly, fuzzy classification is the process of grouping individuals having the same characteristics into a fuzzy set.

There are, however, numerous fuzzy classification methods that may be employed. For example, in some cases, the fuzzy logic may be more representative of confidence value.

For storing such capability information, the network-enabled device 70 may comprise a data store 82. The data store 82 may be accessed by a processor unit 78 of the network-enabled device 70 for modifying, storing, reading, deleting, editing, swapping, etc. capability information of the data store 82.

The communication interface 72 may also communicate a status signal indicative of the status of the device. The status signal may comprise information that may be used to monitor or detect if the device 70 fails (or is about to fail). In this regard, "failing" may refer to the failure to perform all or part of a function, the lack of ability or availability of the device which may prevent a function from being performed, or to an expected event or outcome not occurring. The status signal may therefore comprise information relating to at least one of: the status of an assigned function; a power status of the network-enabled device; an anticipated failure of the network-enabled device; an expected outcome of performing a function; a location of the network-enabled device; a communication signal strength of the network-enabled device; an observation of an expected event; authentication information; a timestamp, and a request identifier.

The processor unit 78 may implement a device monitoring process which is adapted to identify an occurrence (or expected occurrence) of an error or failure of the device 70 to perform a function. Upon identifying an occurrence (or expected occurrence) of such an error or failure, the processor unit 78 may generate an error signal indicative of the (actual or expected) occurrence of an error or failure and pass the generated error signal to the communication interface 72. The communication interface 72 may communicate the generated error signal to a remotely located network node (not shown) via the internet 74, for example using a wireless communication link 76.

In the example of FIG. 1, the communication interface 72 may also be adapted to receive a function assignment signal via the internet 74. The function assignment signal may be indicative of an assigned function, wherein the function has, for example, been assigned by a user of the device 70 or by an application of a network node. For this purpose, the function assignment signal may include a function identifier, a data payload, and/or function entry point data. The communication interface 72 may pass a received function assignment signal to the processor unit 78 for processing in accordance with one or more algorithms so to identify the assigned function from the received function assignment signal. The processor unit 78 may then control operation of the network-enabled device 70 so as to perform the assigned (i.e. identified) function.

It is noted here that the example device 70 of FIG. 1 may also comprise a user input interface 80 for receiving a user input signal. The user input signal may include many different forms of data or information for controlling the operation of the network-enabled device 70. Thus, included in such user input signal may be one or more function assignment signals indicative of function to be performed by the network-enabled device 70. For example, a user input signal may include identification information of a function to be performed, along with data for defining variables and/or parameters of the function.

From the above description of the network-enabled device 70, it will be understood that the device 70 may operate in a manner which will now be described in the following three paragraphs.

The network-enabled device 70 may announce and/or register its availability to a network of devices by communicating, to one or more devices or nodes of the network, capability information representative of its capabilities, wherein the capability information may comprise a fuzzy representation of the device capabilities. The network-enabled device 70 may also communicate (e.g. periodically, continually, sporadically or upon function completion) a status signal indicative of the status of the network-enabled device 70.

In the event of one or more devices or nodes of the network detecting failure (or expected failure) of the network-enabled device (e.g. by detecting a loss of the status signal for example), the capability information submitted by the network-enabled device 70 may be analyzed by one or more devices or nodes of the network in order to identify which of the networked devices may perform part or all of a function (or similar function) of that of the failing/failed network-enabled device 70. Identified devices may then be assigned failover functions based on their identified capabilities so that the same or similar function(s) of the failing/failed network-enabled device 70 are undertaken by the identified devices.

Similarly, in the event of a device (different from the network-enabled device 70) failing, the capability information submitted by that different device may be analyzed by one or more devices or nodes of the network in order to identify which of the networked devices may perform part or all of a function (or similar function) of the failing/failed device. The network-enabled device 70 may, for example, be identified as a device that can perform the same or a similar function (based on its capability information) and thus be assigned a failover function. The assigned failover function may be communicated to the network-enabled device 70 as part of an assignment signal that the network-enabled device 70 receives via its communication interface 72. In this way, the network-enabled device 70 may be assigned one or more failover functions based on its capabilities so that the same or similar function(s) of the failing/failed device 70 are undertaken by the network-enabled device.

Figure 2:
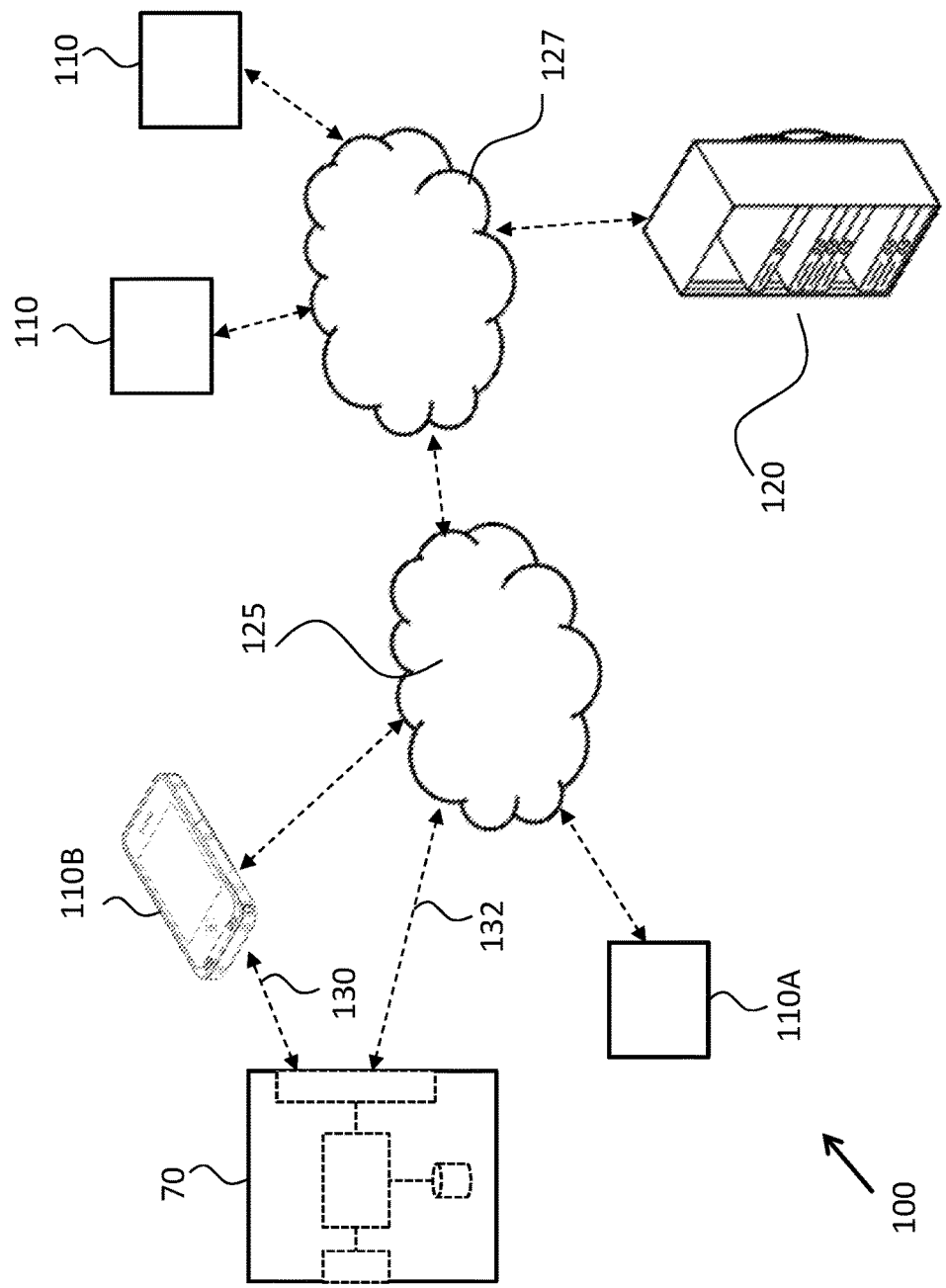
FIG. 2 is a simplified block diagram of an exemplary implementation of a system of network-enabled devices according to an embodiment.

Turning now to FIG. 2, an exemplary implementation of a system 100 of network-enabled devices according to an embodiment will now be described.

The system 100 comprises a first network-enabled device 70 having a first set of capabilities. By way of example only, the first network-enabled device 70 of FIG. 2 is substantially the same as that of FIG. 1.

The system also comprises a plurality of second network-enabled devices 110 each having a respective set of different capabilities. By way of example, each of the second network-enabled devices 110 has a respective set of capabilities that is different from the first set of capabilities of the first network-enabled device 70. In this example, two of the second network-enabled devices 110 are connected to the Internet 127 via respective communication links, and another two 110A, 110B of the second network-enabled devices 110 are connected to a Local Area Network (LAN) 125 via respective communication links. The first network-enabled device 70 is also connected to the LAN 125 via a communication link 132. The first network-enabled device 70 may also be connected to one of the second network-enabled devices 110 which is connected to the LAN 125. The connection between the first network-enabled device 70 and the second network-enabled device 110B may, for example, be establishing via a short-range communication link 130 (such as a Wi-Fi or Bluetooth® link), although it will be understood that any suitable short-range or long-range communication links and/protocols may be employed for this link (and other links) between the network-enabled devices.

The system 100 may determine the first network-enabled device 70 is unable or unavailable to perform a function based on a status signal communicated by the first network-enabled device 70 via the LAN 125 and the internet 127. Based on information about the respective capabilities of the second network-enabled devices 110, the system 100 may identify a second network-enabled device 110A to assign a failover function to. The system 100 may communicate, to the identified second network-enabled device 110A, an assignment signal identifying the failover function as the assigned function. In response to receiving such an assignment signal, the identified second network-enabled device 110A may identify and perform the assigned failover function.

By way of example only, the system 100 may comprise a management server 120 that is adapted to receive capability information from the network-enabled devices 70, 110. The management server 120 may comprise a cloud server 120 which provides one or more applications as a service for the system 100. The application(s) may implement a monitoring process which is adapted to monitor a status signal and/and error signal communicated by the first network-enabled device 70 in order to detect failure of the first network-enabled device 70. In response to detecting failure of the first network-enabled device 70, the application(s) may analyze information about the respective capabilities of the network-enabled devices 70,110 so as to identify one or more second network-enabled devices 110 to assign a failover function.

The failover function may differ from the function that the first network-enabled device 70 is unable or unavailable to perform. For example, the first network-enabled device 70 may be an internet-enabled alarm clock 70 which is adapted to implement an alarm function. Upon failure of the alarm clock 70, because for example its battery runs out, a periodic heartbeat signal that it broadcasts (to a mobile smartphone 110B via a short-range wireless communication link 130, and to the management server 120 via wireless LAN connection 132 and the internet 127) is no longer communicated by the alarm clock 70. Absence (e.g. non-reception) of the periodic heartbeat signal within an expected timeframe, is detected by at least one of the smartphone 110B and the management server 120 and determined to indicate failure of the alarm clock 70. In response to determining the failure of the alarm clock 70, the application(s) of the management server 120 analyzes information about the respective capabilities of the network-enabled devices 110 so as to identify one or more second network-enabled devices 110 to assign a failover function. Here, it may be determined that the smartphone 110B and a wireless doorbell 110A comprise suitable functionality to implement at least part of an alarm function. More specifically, it may be determined that an entire alarm clock functionality can be implemented by the smartphone 110B (e.g. using the built-in clock application and speaker of the smartphone 110B), and it may be determined that the alarm/sound functionality of an alarm clock can be implemented by the wireless doorbell 110A (e.g. using the bell). The application(s) of the management server 120 may thus generate a first function assignment signal indicative of an assigned alarm clock function and then cause the management server 120 to communicate the first function assignment signal to the smartphone 100B. The application(s) of the management server 120 may also generate a second function assignment signal indicative of an assigned alarm-sound function and then cause the management server 120 to communicate the second function assignment signal to the wireless doorbell 110A. Because the wireless doorbell 110A may not comprise a clock functionality to determine when to sound the bell, only the alarm sound function may be assigned to the wireless doorbell, thus leaving the smartphone 110B and/or management server 120 to communicate a bell activation signal/instruction to the wireless doorbell 110A at the appropriate time.

Figure 3A:
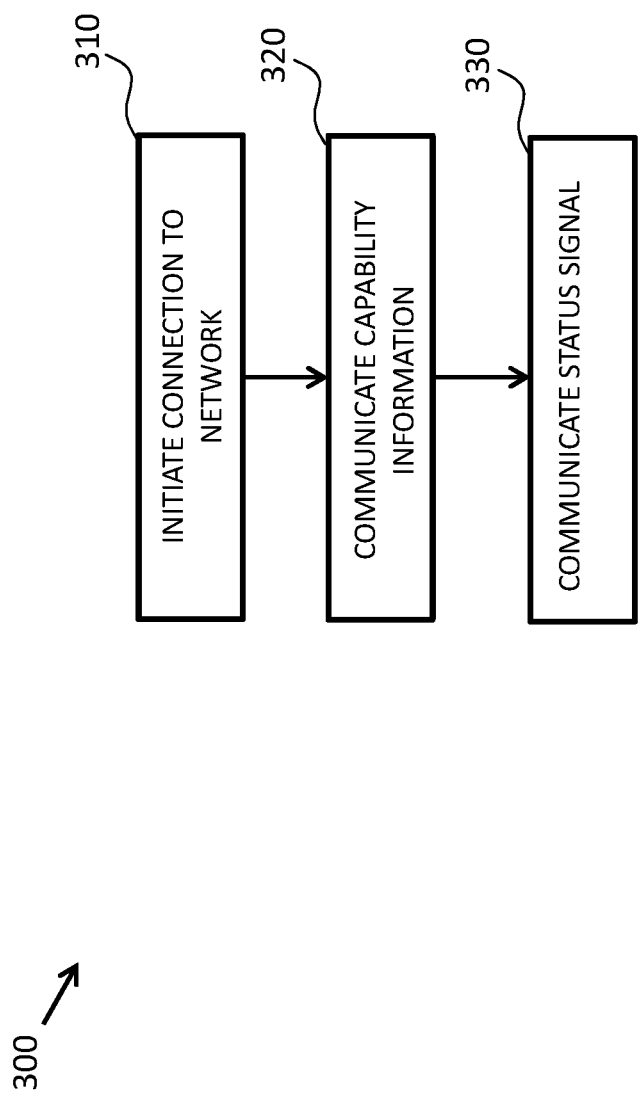
FIG. 3A depicts a flow diagram of a device operation method according to an embodiment.

Referring now to FIG. 3A, there is depicted a flow diagram of a device operation method 300 that may be employed by an embodiment. Here, the method is described as being implemented by a network-enabled device according to a proposed embodiment.

The method 300 may begin in step 310, wherein the network-enabled device may initiate a connection to a network comprising a plurality of networked (e.g. communicatively coupled) devices. By way of example, the connection may employ any suitable short-range or long-range communication links and/protocols, and thus the step of initiating a connection may comprise conventional link initiation steps/procedures in accordance with the associated protocol(s).

Having established the connection in step 310, the method may then proceed to step 320 of communicating, from the network-enabled device to at least one network node, capability information representative of the set of capabilities of the device. The capability information may comprise a data structure, such as a lookup table or list, for example, comprising information representative of the capabilities of the network-enabled device.

In other embodiments, the capability information may comprise a fuzzy logic representation of the capabilities of the network-enabled device. For example, one may consider an instance wherein the network-enabled device communicates its classifications, which may include: its high-level function(s) and the requirements that enable the function(s); its full set of capabilities; and the rules that define the capability/capabilities. Capabilities may be inferred through device specifications and shared rules, the rules being shared by the device itself.

For instance:

```
{
"component": "AlarmClock",
  "requirements": {"time" : "24hr", "noise" : "70<dB<100"},
  "capabilities": {"time" : "1", "noise" : "1"}
}
```

Next, in step 320, the process of communicating a status signal indicative of the status of the device to at least one network node is undertaken. This may, for example, comprise periodically (e.g. every minute, hour, day, week, month, or some other predetermined time period) broadcasting a status signal including information relating to the status of the network-enabled device. Such information may relate to at least one of: the status of a function of the device; a power status (e.g. battery level) of the network-enabled device; an anticipated failure of the network-enabled device; an expected outcome of performing a function; a location of the network-enabled device; a signal strength of the network-enabled device; an observation of an expected event; authentication information; a timestamp, and a request identifier.

In other embodiments, the status signal may be communicated upon the occurrence of one or more predetermined events, or sporadically. For example, the status signal may be communicated when the value of a device parameter (such battery level, signal strength, available resource(s), etc.) falls below an acceptable threshold level. Such a status signal may thus function as a status warning which may or may not be acted upon, depending on predetermined preferences or requirements for example.

Repeated execution of registration method 300 and/or step 320 may, therefore, enable a data store to be built and maintained as and when new resources or capabilities are made available.

This would mean that when network-enabled devices join, they can share their own relevant values, and perform a global update of any existing rule-based capabilities, such as the following for example:

```
{
  "component": "DoorBell",
    "requirements": {"slightNoise" : "50<dB<80"},
       "capabilities": {"slightNoise" : "1", "noise" : "0.7"}
    }
}
```

Here a new capability of "slightNoise" has been introduced to the system. Comparing the requirements of "slightNoise", with those "noise" (introduced in AlarmClock) allows a weighting for "noise" for the component to be made. In this case, as an illustrative example, a weighting of 0.7 has been assigned for "noise".

```
"component" : "SoundSystem",
"requirements": {"loudNoise" : "90<dB<150"},
"capabilities": {"loudNoise" : "1", "slightNoise" : "0.4", "noise" : "0.6"}
}
}
```

Here a new capability of "loudNoise" has been introduced to the system. Comparing the requirements of "loudNoise", with those "noise" (introduced in AlarmClock), and with "slightNoise" (introduced in DoorBell) allows a weighting for "noise", and a weighting for "slightNoise" for the component to be made. In this case, as an illustrative example, a weighting of 0.6 has been assigned for "noise", and a weighting of 0.4 has been assigned for "slightNoise"

In the above, an example rule was passed in the function requirements, and the full list of capabilities was augmented with the relevant capability classifiers for other items already present. In the same scenario, all present items may need to be updated to reflect any new capability:rule identifiers.

In this way, there may be defined a shared list of fuzzy identifiers for all connected components. From the above, one can now consider the requirement to search for a replacement to "noise(70<dB<100)" if the alarm clock was to fail: the options are Door Bell (0.7) or Sound System (0.6). Consequently, it may be determined that the door bell is the most appropriate item to use as a replacement.

It is noted that the above example is for single capability replacement, though embodiments may extend the same for multiple capabilities, wherein it is sought to form a replacement system that maximizes the final score. The simplest of this might be by selecting the highest weighted component from each of the available components, although it may be desired to limit the number of items participating in creating a replacement (e.g. by attempting to maximize a cost function that penalizes highly distributed replacements).

Figure 3B:
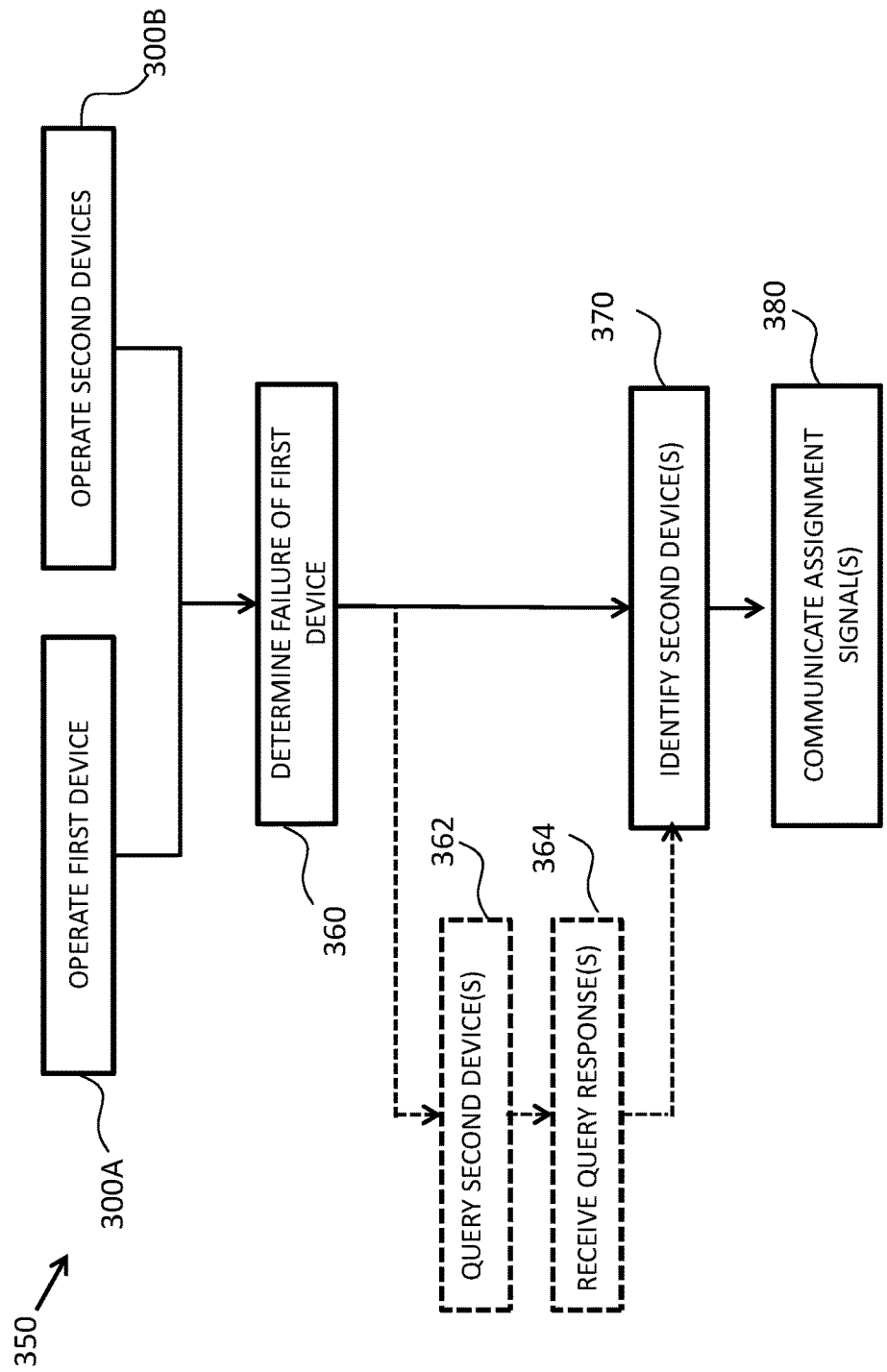
FIG. 3B depicts a flow diagram of a method for managing a network of connected devices according to an embodiment.

Referring now to FIG. 3B, there is depicted a flow diagram of a method 350 for managing a network of connected devices according to an embodiment. The method is described as being implemented by a connectivity component (e.g. management module) according to a proposed embodiment.

In step 300A, a first network-enabled device having a first set of capabilities is operated according to the method 300 depicted in FIG. 3A. In this way, the first network-enabled device may initiate a connection to the network and communicate capability information about the first network-enables device's capabilities to at least one node or device of the network. Also, the first network-enabled device may communicate a status signal indicative of the status of the device. Such communication of the status signal may be undertaken when a predetermined condition or status is met by the first network-enabled device. Alternatively, such communication of the status signal may be undertaken periodically (e.g. like a heartbeat broadcast signal), for example, every second, minute, or hour, etc.

In step 300B, a plurality of second network-enabled devices having respective sets of capabilities (different from the first set of capabilities) are operated according to the method 300 depicted in FIG. 3A. In this way, the second network-enabled devices may initiate a connection to the network and communicate capability information about their capabilities to at least one node or device of the network.

In step 360, it may be determined that the first network-enabled device is unable or unavailable to perform a function based on a status signal communicated by the first network-enabled device. By way of example, the step 360 of determining the first network-enabled device is unable or unavailable to perform a function may comprise detecting the occurrence of a predetermined condition at the first network-enabled device, and the predetermined condition may relate to at least one of the status of a function assigned to the first network-enabled device, non-receipt of a status signal from the first network-enabled device, a power status of the network-enabled device (that may be determined based on a status signal from the first network-enabled device), an anticipated failure of the network-enabled device (e.g. based on signal strength or power/battery status information provided by a status signal), an expected outcome of performing a function, a location of the network-enabled device, a communication signal strength of the network-enabled device, and an observation of an expected event (e.g. failure to perform a function as reported by a communicated status signal).

Step 370 then comprises identifying a second network-enabled device to assign a failover function to based on the respective capabilities of the second network-enabled devices. Here, the capability information submitted by the network-enabled devices may be analyzed by one or more devices or nodes of the network in order to identify which of the networked devices may perform part or all of a function (or similar function) of that of the failing/failed first network-enabled device. A second network-enabled device may, for example, be identified as a device that can perform the same or a similar function (based on its capability information) and thus be assigned a failover function.

In step 380, the assigned failover function may then be communicated to the identified network-enabled device as part of an assignment signal. In this way, the identified network-enabled device may be assigned a failover function based on its capabilities so that the same or similar function(s) of the failing/failed first network-enabled device may be undertaken by the identified network-enabled device.

Thus, from the above description of the method of FIG. 3B, it will be appreciated that a method of identifying a second network-enabled device to assign a failover function to may be provided. It should also be appreciated that the method of identifying a second network-enabled device, may or may not require a query and response procedure to be implemented (for example, between a management server and second network-enabled device).

In the case that such a query and response procedure is to be employed, the method 350 may comprise additional steps 362 and 364. Step 362 may, for example, comprise querying one or more second network-enabled devices to check device availability (e.g. signal strength, location, power status, operating mode, available resource(s), etc.). Then, in step 364, one or more responses to the query/queries may be provided (e.g. communicated or transmitted) back to the appropriate destination, for example, the originator of the query. The query responses may then be analyzed in order to determine which second network-enabled device to assign a failover function to.

By way of example, a data store of a management server may be dynamically or automatically maintained using a registration/deregistration process so as to reflect changes in the available network-enabled device. Thus, in addition to implementing the method 300 of FIG. 3A, a device de-registration method may be employed. Such a de-registration process may be executed in response to changes in connectivity for example. These changes may be signaled by the removal of resources or communication links, and/or may be indicated by signal or request indicating that a resource or device is to become unavailable/inaccessible. The capability information may, therefore, be updated (e.g. edited, removed, or added) by using a deregistration process which thus enables the concept of updating/maintaining a data store of capability information in a dynamic or automatic manner.

It will be understood that embodiments may be adapted to add and remove capability information from a data store in response to status changes in an application, a device, a server and/or a device resources. Put another way, embodiments may dynamically update or maintain any structured data resource in order to reflect changes in available resources and/or devices.

Figure 3C:
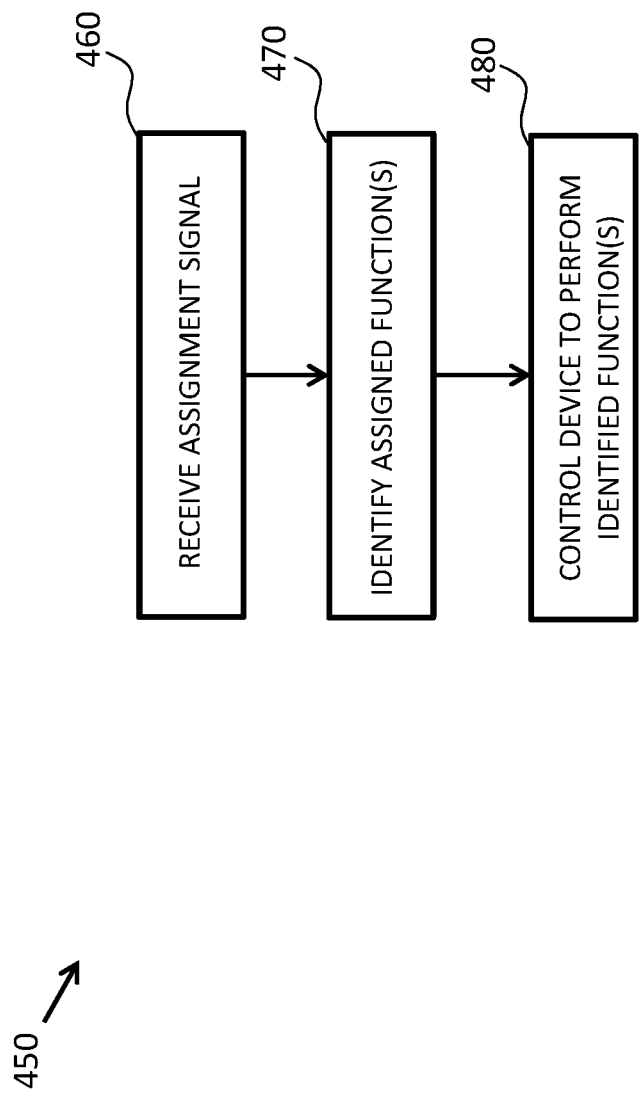
FIG. 3C depicts a flow diagram of a method of operating a network-enabled device according to embodiment.

Referring now to FIG. 3C, there is depicted a flow diagram of a method 450 of operating a network-enabled device according to an embodiment. In step 460, a network-enabled device receives a function assignment signal indicative of an assigned function from an application of a network node. For example, the function assignment signal may be communicated in accordance with step 380 of the method 350 of FIG. 3B.

From the received function assignment signal, the assigned function may then be identified in step 470. The network-enabled device may then perform the assigned function in step 480.

It will be appreciated that embodiments, such as that presented above with reference to their figures may provide the benefit passing a function of a first network-enabled device to one or more other network-enabled devices upon failure (e.g. inability or unavailability) of the first network-enabled device to perform the function. If the other network-enabled devices do not have the same capabilities of the first network-enabled device, part or all of the function may be emulated or replaced by equivalent or similar functionality by taking advantage of available capabilities.

As will be apparent from the above description, a network-enabled device or resource may be provided by a cloud-computing system. Also, a management server/application may be provided or implemented by a cloud-computing system.

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and the environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This off-premise cloud model may include at least five characteristics, at least three service models, and at least four deployment models.

Characteristics are as follows:

On-demand self-service: a cloud consumer can unilaterally provide computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
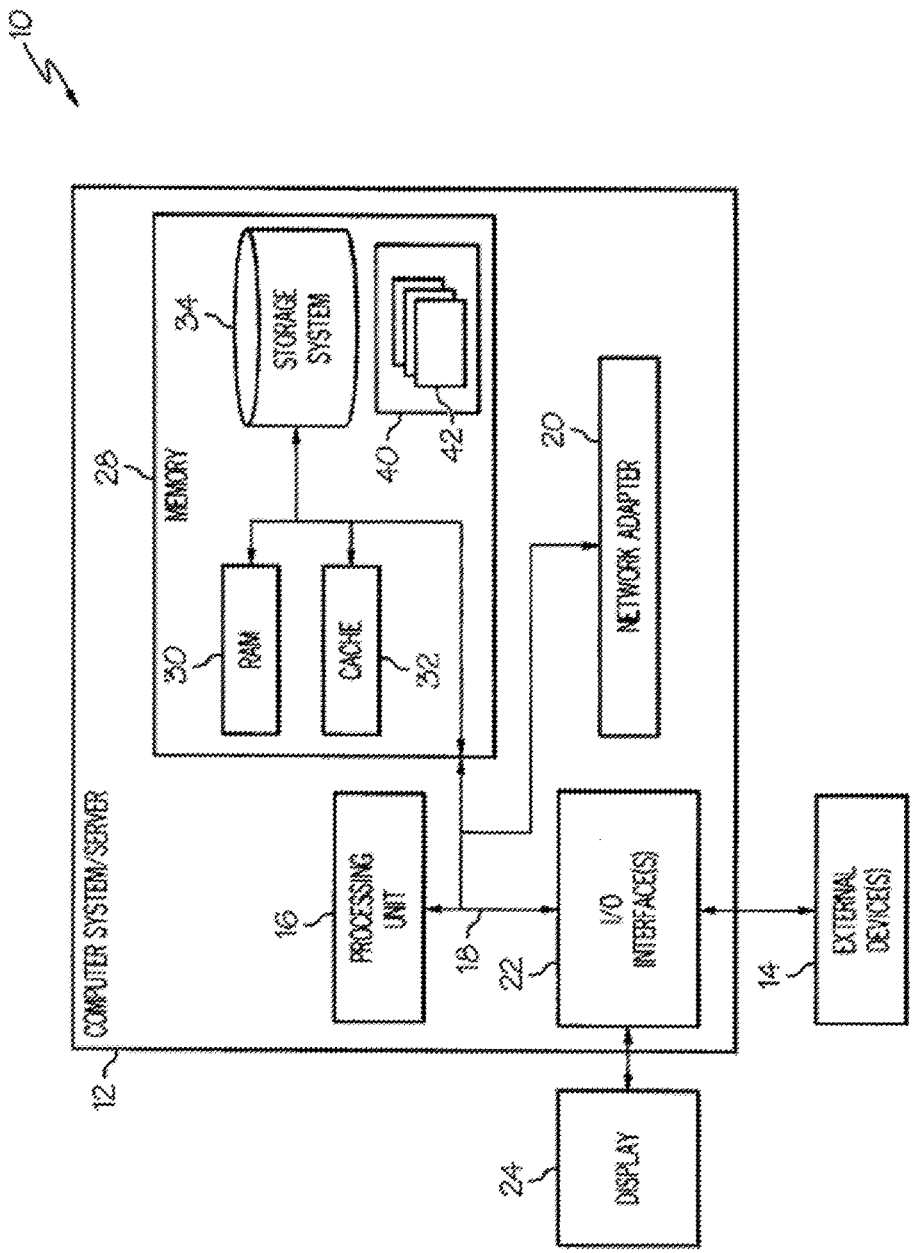
FIG. 4 illustrates a cloud system node.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to microcode, device drivers, redundant processing units, external disk drive arrays, RAID systems, tape drives, and data archival storage systems, etc.

Figure 5:
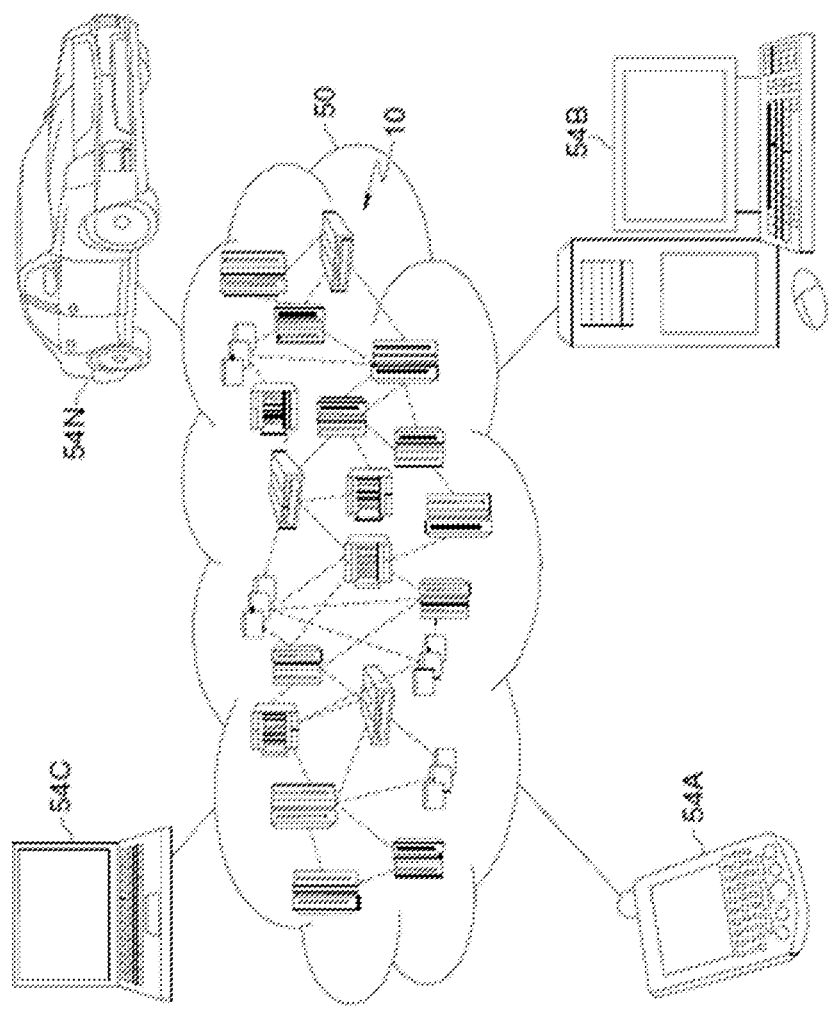
FIG. 5 illustrates a cloud computing environment according to an embodiment.

Referring now to FIG. 5, illustrative cloud computing environment or cloud computing system 50 is depicted. This can, in embodiments, be equated to the cloud computing system 400 as depicted in FIG. 2. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
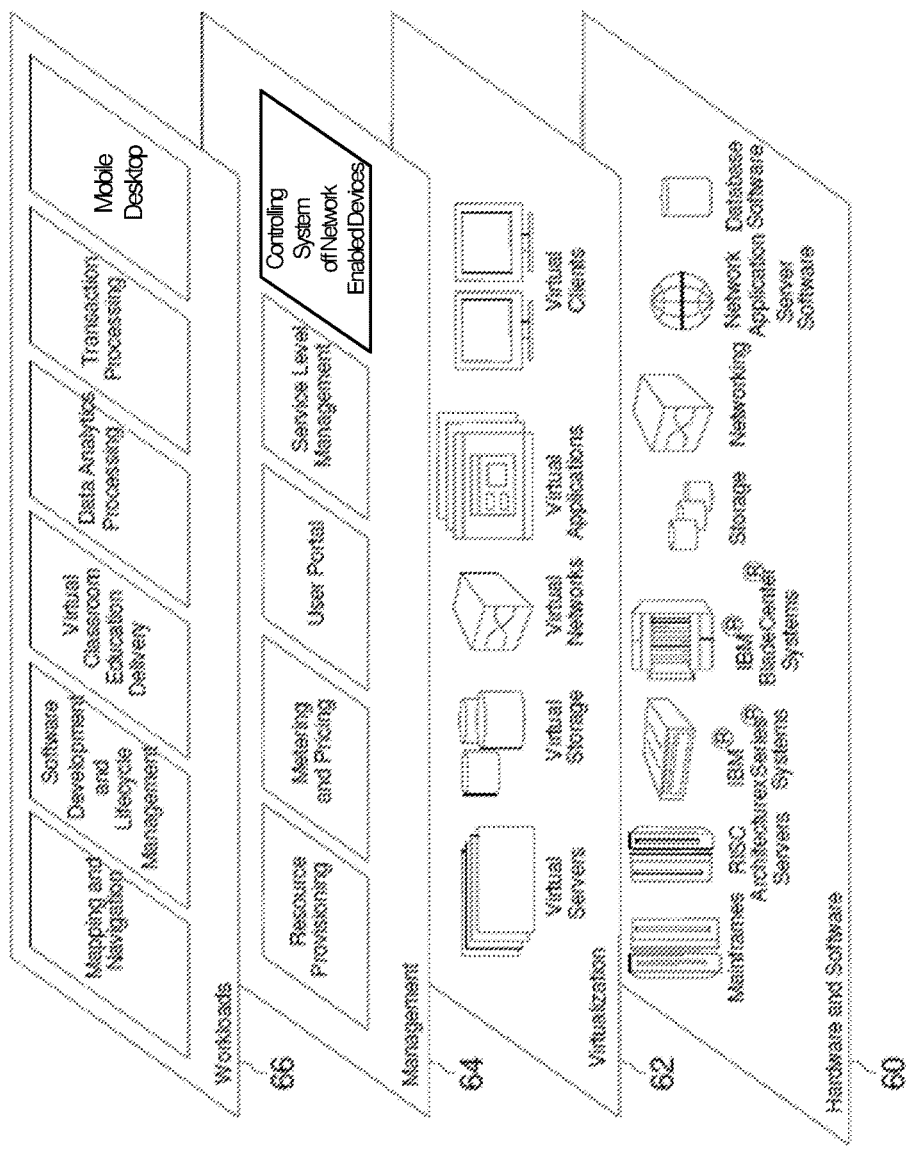
FIG. 6 illustrates cloud abstraction mode layers according to an embodiment.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Controlling system of network-enabled devices provides for assigning failover functionality to network-enabled devices, according to proposed concepts as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method of controlling a system of network-enabled devices, the method comprising:
   operating a first network-enabled device having a first set of capabilities;
   operating a plurality of second network-enabled devices each having a respective set of different capabilities;
   determining the first network-enabled device is unable or unavailable to perform a function based on a status signal communicated by the first network-enabled device;
   identifying a second network-enabled device to assign a failover function to based on the respective capabilities of the second network-enabled devices, and
   communicating, to the identified second network-enabled device, an assignment signal identifying the failover function as the assigned function,
   wherein the first set of capabilities of the first network-enabled device or the respective set of capabilities of the second network-enabled devices includes one or more high-level functions that the respective network-enabled device is capable of performing, rules that define an operation of the one or more high-level functions and requirements that enable each of the one or more high-level functions and wherein the rules for each of the one or more high-level function includes an identification and weighting value for each related high-level function.

2. The method of claim 1, further comprising:
receiving, at a management server: capability information from the second network-enabled devices; and the status signal communicated by the first network-enabled device: and
executing an application on the management, the application identifying the second network-enabled device to assign the failover function to and generating the function assignment signal.

3. The method of claim 1, wherein each of the second network-enabled devices has respective set of capabilities that is different from the first set of capabilities.

4. The method of claim 1, wherein determining the first network-enabled device is unable or unavailable to perform a function comprises:
detecting an occurrence of a predetermined condition at the first network-enabled device, wherein the predetermined condition relates to at least one of:
the status of an assigned function;
non-receipt of a status signal from the first network-enabled device
a power status of the network-enabled device;
an anticipated failure of the network-enabled device;
an expected outcome of performing a function;
a location of the network-enabled device;
a communication signal strength of the network-enabled device; and
an observation of an expected event.

5. The method of claim 1, wherein the failover function differs from the function that the first network-enabled device is unable or unavailable to perform.

\* \* \* \* \*